J. F. JOY.
CONVEYER.
APPLICATION FILED AUG. 19, 1920.

1,405,419.

Patented Feb. 7, 1922.

Inventor
J. F. Joy

By A. M. Wilson

Attorney

UNITED STATES PATENT OFFICE.

JOSEPH F. JOY, OF PITTSBURGH, PENNSYLVANIA.

CONVEYER.

1,405,419.   Specification of Letters Patent.   Patented Feb. 7, 1922.

Application filed August 19, 1920. Serial No. 404,493.

*To all whom it may concern:*

Be it known that I, JOSEPH F. JOY, a citizen of the United States of America, residing at Pittsburgh, in the county of Allegheny and State of Pennsylvania, have invented certain new and useful Improvements in Conveyers, of which the following is a specification.

This invention relates to certain new and useful improvements in conveyers of the well known chain and scraper type and is particularly designed for use in loading machines such as disclosed in my United States Patent 1,306,064, dated June 10, 1919, although adaptable for general application.

One of the greatest troubles with conveyers in machines of the above kind has been due to the flights or scraper bars getting tangled up in the underside of the endless conveyer member or that part of the same which is known as the return flight of the conveyer. One of the principal objects of the invention is therefore to provide means for attaching the conveyer scraper bars to the chains in such a manner as to permit the scraper bars to entirely detach themselves in the event that either end of a scraper bar should become loosened or the bar become bent.

Another object of the present invention is to provide an endless conveyer member, including the usual spaced parallel pair of endless chains connected at intervals by transverse scraper bars, with improved means for detachably connecting the scraper bars to the chains.

A further object of the invention is to provide an extremely durable but simple form of scraper bar together with simple and durable means for connecting the ends of the same to the endless chains.

Further objects will become apparent as the nature of the invention is better understood and the same consists in the novel construction, combination and arrangement of parts hereinafter more fully described, illustrated in the accompanying drawings, and pointed out in the appended claims.

Figure 1:
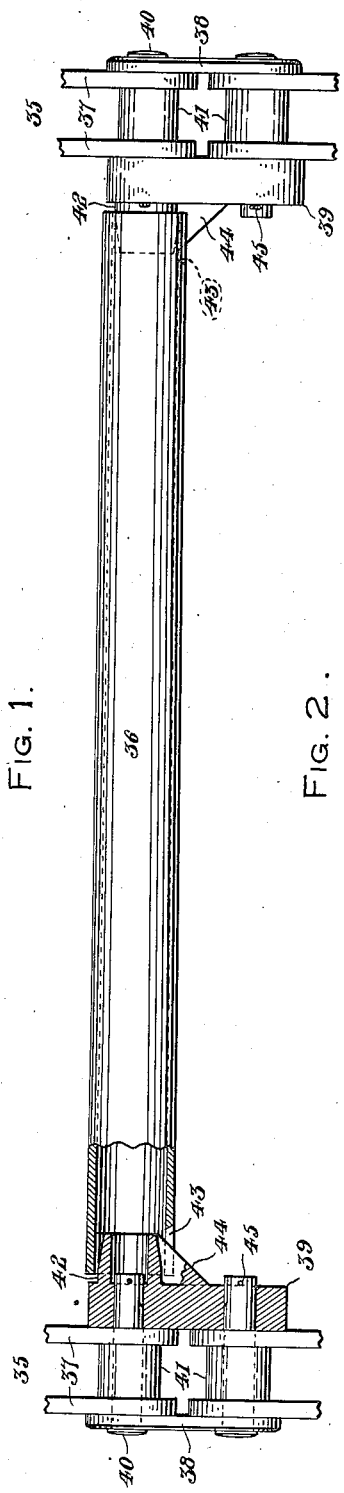
Figure 2:
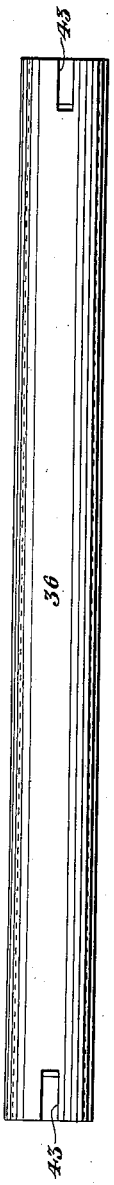
Figure 3:
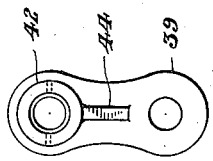

In the drawings forming a part of this application and in which like designating characters refer to corresponding parts throughout the several views, Figure 1 is a fragmentary view partly in plan and partly in section illustrating a portion of a conveyer constructed in accordance with the present invention, Figure 2 is an elevational view of one scraper bar and Figure 3 is an elevational view of one of the connecting links to which the scraper bars are attached.

Referring more in detail to the several views, it will be understood that the present improvement relates to the construction of the endless conveyer member in my above-mentioned patent comprising broadly the chains 35 connected by transverse scraper bars 36, the chains 35 broadly each comprising pairs of inner links 37 and outer links 38 and 39 pivotally connected by pins 40 and spaced by rollers 41.

In accordance with the present invention, the scraper bars 36 are of tubular form and open at both ends for slidable reception upon the tubular inwardly-extending studs 42 provided on the inside outer links 39 co-incident with the adjacent one of the pivot pins 40, the ends of the tubular bars 36 being inwardly slotted as at 43 for reception of the webs 44 which connect the bases of the links 39 with the studs 42 thereof. The scraper bar carrying links 39 are preferably constructed of greater thickness than the links 37 and 38, thereby being more durable for withstanding wear and tear upon the same due to the scraper bars 36 being carried thereby. It will thus be seen that the ends of each scraper bar 36 may be slid onto aligned pairs of the studs 42 so that the webs 44 enter the slots 43; the scraper bars are thus held from rotation.

It will be understood that the chains 35 are of the unsual construction with the exception of the provision of the special links 39 at desired points for enabling fastening of scraper bars 36 thereto, the pivot pins 40 at such points being of sufficient length to pass through the link 39 and then fastened by pins 45 or some equivalent means.

It will be seen that an endless conveyer member constructed in accordance with the present invention may be readily assembled and cheaply and easily manufactured, the parts being of comparatively light weight without sacrificing durability.

It is believed that the construction and utility of the present invention will be readily understood and the advantages thereof appreciated by those skilled in the art.

Minor changes may be made without departing from the spirit and scope of the invention as claimed.

What I claim as new and desire to secure by Letters Patent, is:—

1. In an endless member of a chain and scraper conveyer, the combination with the usual pair of endless chains including inner and outer links, special inside outer links forming part of said chains at intervals and including inwardly projecting studs with webs extending therefrom, and a tubular scraper bar having its ends telescopically receiving said studs of adjacent pairs of special links and provided with end slots with the webs disposed therein whereby said bars are retained from rotation.

2. In an endless chain and scraper conveyer member, a pair of opposed inside links having inwardly projecting studs, a tubular scraper bar telescopically receiving said studs in the ends thereof, and means carried by said links and engaging the scraper bars to retain the same against rotation.

3. In an endless chain and scraper conveyer member, a pair of opposed inside links having inwardly projecting studs, a tubular scraper bar telescopically receiving said studs in the ends thereof, and means carried by said links and engaging the scraper bars to retain the same against rotation, said last-named means including integral members on the links projecting through said scraper bars.

4. In an endless conveyer member of the chain and scraper type including a pair of endless chains formed of pivotally connected inner and outer links, special inside outer links for said chains having inwardly projecting studs coincident with pivot pins of the same and provided with webs connecting their bases to the studs, and a tubular scraper bar arranged between aligned studs of said inside links with the studs of the latter telescoped in the ends of the scraper bar, said scraper bar having slots at its ends receiving said webs whereby the scraper bar is retained from rotation relative to the studs.

5. In an endless conveyer member of the chain and scraper type wherein there is provided a pair of endless chains connected at intervals by transverse scraper bars, special inside links for said chains, and tubular scraper bars having their ends telescoped onto said special links.

6. In an endless conveyer member of the chain and scraper type including a pair of endless chains formed of pivotally connected inner and outer links, special inside outer links for said chains having inwardly projecting tubular studs coincident with pivot pins of the same, and a tubular scraper bar arranged between aligned studs of said inside links with the studs of the latter telescoped into the ends of the scraper bar.

7. In an endless conveyer member of the chain and scraper type including a pair of endless chains formed of pivotally connected inner and outer links, special inside outer links for said chains having inwardly projecting tubular studs coincident with pivot pins of the same, and a tubular scraper bar arranged between aligned studs of said inside links with the studs of the latter telescoped into the ends of the scraper bar, said inside links being provided with webs connecting their bases to the studs, said scraper bar having slots at its ends receiving said webs whereby the scraper bar is retained from rotation relative to the studs.

8. In an endless conveyer member of the chain and scraper type wherein there is provided a pair of endless chains connected at intervals by transverse scraper bars, special inside links for said chains, and tubular scraper bars having their ends loosely and detachably telescoped onto said special links.

In testimony whereof I affix my signature.

JOSEPH F. JOY.